May 26, 1970   W. R. GRAHAM   3,513,811
ANIMAL DRINKING VALVE WITH TWO-PIECE STEM
Filed Dec. 22, 1967
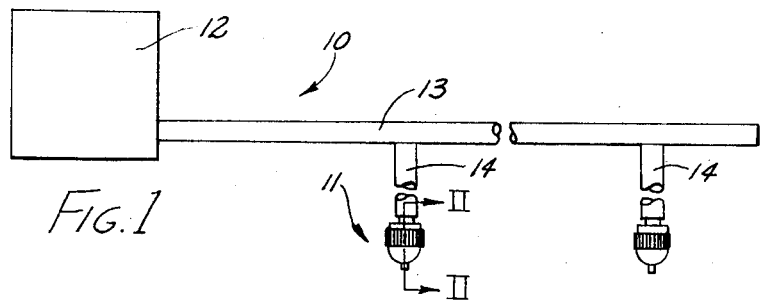
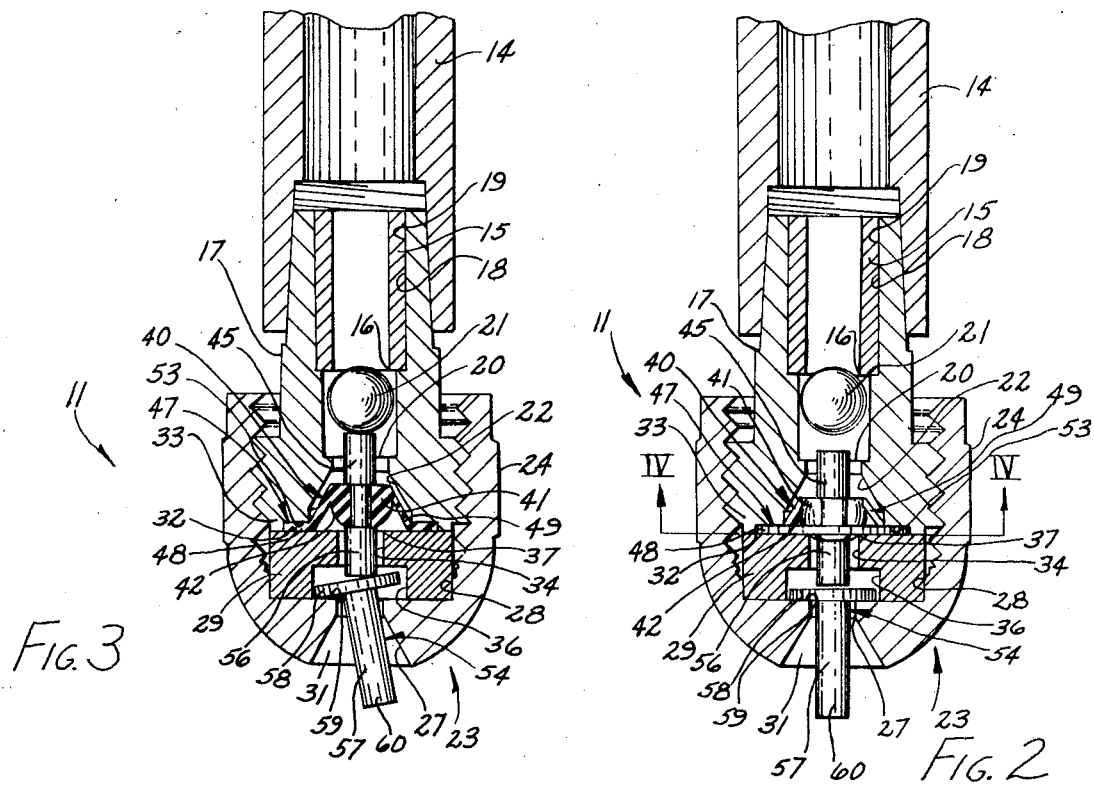
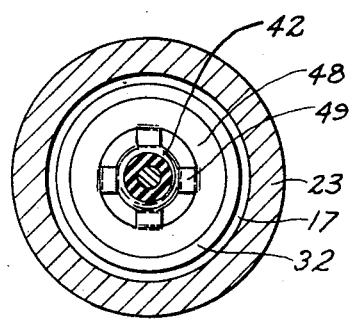
INVENTOR.
WALTER R. GRAHAM
BY
Woodhams, Blanchard and Flynn
ATTORNEYS

3,513,811
ANIMAL DRINKING VALVE WITH TWO-PIECE STEM

Walter R. Graham, Kalamazoo Township, Kalamazoo, Mich., assignor to The Upjohn Company, Kalamazoo, Mich., a corporation of Delaware
Filed Dec. 22, 1967, Ser. No. 692,837
Int. Cl. A01k 7/00
U.S. Cl. 119—72.5        8 Claims

ABSTRACT OF THE DISCLOSURE

A valve assembly comprising first and second separable body parts having a coaxial passageway therethrough and a valve mechanism disposed within said passageway. The valve mechanism includes a check valve within the first body part and a control valve held between the body parts. The control valve has a two-piece valve stem, the free end of which extends through the open end of the second body part.

BACKGROUND OF THE INVENTION

This invention relates in general to a valve assembly for controlling the flow of fluids and, more particularly, to a type of valve assembly through which the flow of liquids can be controlled by an animal, such as a very small rodent, in response to the animal's demand for such liquid.

A number of animal-actuated valves have been developed for controlling the flow therethrough of liquids, such as water, in response to an operation of the valve by the animal, and such valves are particularly used in research laboratories, but may be used elsewhere. Two such valve assemblies are disclosed in copending applications, Ser. No. 666,713, entitled, "Animal Actuated Drinking Valve," and Ser. No. 666,788, entitled, "Animal Actuated Drinking Valve With Check." These valve assemblies have been found highly satisfactory for use with certain animals, such as adult mice and larger rodents. However, they are not particularly adapted for use by smaller and weaker animals, such as youg mice, which must have a valve that is more easily actuated.

Furthermore, some animals, such as rats, have a tendency to pull on the valve stem thereby damaging the valve and/or the valve seat.

Accordingly, a primary object of this invention is the provision of an improved valve assembly capable of easy actuation by small animals, such as young mice, yet difficult to damage, capable of use in a system having plural valve assemblies; capable of being partially disassembled for cleaning and/or repair without affecting the pressure of the liquid in the system to which the valve assembly is connected, and wherein the valve assembly will close automatically in the event of a negative pressure in the system to which the valve assembly is connected so that siphoning of the water from the valve back into the system is prevented.

A further object of this invention is the provision of a valve assembly, as aforesaid, including a two-piece valve stem wherein the exposed portion of the valve stem can be easily replaced without replacing other portions of the valve assembly if desired when working with different animals.

Other objects and purposes of this invention will become apparent to persons familiar with this type of equipment upon reading the following descriptive material and examining the accompanying drawings, in which:

FIG. 1 is a broken, partially schematic view of a fluid supply system including a valve assembly embodying the invention.

FIG. 2 is a sectional view taken along the line II—II in FIG. 1.

FIG. 3 is a view similar to FIG. 2 showing the valve assembly in a different position of operation.

FIG. 4 is a sectional view taken along the line IV—IV in FIG. 2.

For convenience in description, the terms "front," "rear" and words of similar import will have reference to the lower and upper ends, respectively, of the valve assembly embodying the invention as appearing in FIGS. 2 and 3. The terms "inner," "outer," and derivatives thereof will have reference to the geometric center of said valve assemblies and parts thereof. However, these terms are not intended to limit the utility or scope of the invention.

SUMMARY OF THE INVENTION

The objects and purposes of the invention, including those set forth above, have been met by providing a valve assembly comprising first and second, substantially cylindrical body parts which are coaxially and removably connected to each other at adjacent ends thereof. In one embodiment, this connection is effected by matching threads on the adjacent ends of the body parts, which have coaxial and communicating passageways enlarged at their adjacent ends. A pair of spaced and annular check valve seats are provided in the passageway of the first body part and a check valve is disposed between the seats for closing engagement with either seat, one at a time.

An annular valve seat is disposed within an enlarged portion of the passageway in the second body part. A valve device, comprised of a valve head engageable with the valve seat and a two-piece valve stem extending through the valve seat and the passageway in the second body part, is held in the closed position by a resiliently flexible member integral with the valve head and clamped between the adjacent ends of the first and second body parts. A projection on the valve head extends through the adjacent of said pair of check valve seats and is engageable with the check valve to prevent closure of said adjacent check valve seat by the check valve when the two body parts are connected together.

The two-piece valve stem includes an upper stem portion which is integral with said valve head, and a lower stem portion which contacts the upper stem portion and extends through the open end of the second body part.

DETAILED DESCRIPTION

The liquid supply system 10 (FIG. 1), with which the valve assembly 11 of the invention may be used, includes a source 12 of liquid, such as water, under pressure, a main supply line 13 and optionally a plurality of branch lines or pipes 14 connected to the main line 13 at one end and to the valve assembly 11 at the other end. Alternatively, the valve assembly 11 can be connected directly into the main supply line 13.

The valve assembly 11 (FIG. 2), which comprises a preferred embodiment of the invention, has a first or rear body part 17, which is preferably substantially cylindrical and is externally threaded at its rearward end for engagement with internal threads on the branch pipe 14.

The rear body part 17 has a coaxial inlet passageway 18 with an enlarged rear end portion 19 and an enlarged front end portion 22. An inwardly extending annular ridge or check valve seat 20 is provided in the passageway 18 adjacent the rearward end of the enlarged front portion 22 for engagement by the spherical checkvalve 21.

A cylindrical sleeve 15 is firmly disposed within the enlarged rear portion 19 of the passageway 18 so that its front end defines a check valve seat 16, also for engagement by the spherical check valve 21. The check valve seats 16 and 20 are spaced from each other so that they cannot be simultaneously closed by the check valve 21.

The front end of the rear body part 17 is externally threaded for engagement with internal threads on the rearward end of the front body part 23. The peripheral surface 24 of the front body part 23 between the front and rear threaded portions thereof may be knurled or provided with an out-of-round cross section to facilitate the gripping thereof when the front body part 23 is connected to the rear body part 17.

The front body part 23 has a coaxial outlet passageway 27 which has an enlarged portion 28 at its rearward end, adjacent to and opening toward the enlarged portion 22 in the rear body part 17, and has a frontwardly diverging, frustoconical portion 31. An annular insert 29 is snugly disposed within the enlarged portion 28 so that its rear surface 32 will be close to the front end 33 of the rear body part 17 when it is connected to the front body part 23. Said annular insert 29 has a coaxial opening 34, the rear portion of which defines a relatively sharp and annular valve seat 37 adjacent the rear surface 32. The coaxial opening 34 also has an enlarged front portion 36.

The valve device 40 (FIGS. 3 and 4) is comprised of a valve head 41 preferably having a hemispherical surface 42 which is sealingly engageable with the valve seat 37. The valve device 40 includes a resiliently flexible and wheel-shaped member 47 having an outer ring 48 of rectangular or other cross-sectional contour and a plurality of radially disposed and resiliently flexible elements 49 which are preferably integral with and extend between the ring 48 and the valve head 41. In this embodiment, the valve head 41, the elements 49 and the ring 48 are formed, as by molding, in a single unit from an elastomeric material, such as rubber either natural or synthetic, silicone rubber, or other suitable material.

The ring 48 (FIG. 2) is of such size and shape that it can be firmly clamped between the rear surface 32 of the annular insert 29 and the front end 33 of the rear body part 17. A slight annular recess 53 may be provided in the front end 33 of the rear body part 17 to limit compression of outer ring 48 to avoid distortion of the ring 48 and/or elements 49 when the two body parts are assembled.

The ring 48 serves also to prevent leakage of liquid from the inlet passageway 18 between the front end 33 of the rear body part 17 and the insert 29. Accordingly, liquid within the inlet passageway 18 can enter the outlet passageway 27 only through the opening 34 in the annular insert 29 when the valve head 41 is spaced from the valve seat 37, as shown in FIG. 3.

The valve head 41 is held against the valve seat 37 by the resiliently flexible elements 49 which, as shown in FIG. 2, are under tension when the ring 48 is clamped between the rear body part 17 and insert 29. As shown in FIG. 2, a substantial portion of the valve 41 is disposed within the enlarged front portion 22 of the inlet passageway 18 when the valve head is seated. Additional axial space is provided within said enlarged front portion 22 for reception of the valve head 41 when it is unseated, as shown in FIG. 3.

The valve device 40 has a two-piece valve stem 54 comprising a rear part 56 and a front part 57, the rear part 56 of which extends through the valve head 41 and beyond the front and rear sides thereof, as shown in FIG. 3. The rear extension 45 of the valve stem part 56 projects through and beyond the valve seat 20 to engage the checkvalve 21. The front end of the valve stem part 56 extends into the enlarged portion 36 of the annular insert 29.

The front valve stem part 57 has a radial flange 58 which, when the valve device 40 is in the closed position illustrated in FIG. 2, bears in sealing engagement against the shoulder 59 in the front body part 23. The front valve stem part 57 has a front end 60 which extends through the outlet passageway 27 in the front body part 23. The cross-sectional areas of the various parts of the valve stem 54 are substantially smaller than the cross-sectional areas of the corresponding portions of the passageways 22, 34, 36, and 27, respectively, through which the stem 54 extends so that liquid can flow through said passageways when the valve head 41 is held away from the valve seat 37 and the flange 58 is spaced from the shoulder 59. The flange 58 is arranged so that it will engage the stem part 56 and thereby unseat the valve head 41 when the front end 60 of the stem part 57 is moved sidewardly, as shown in FIG. 3, or axially.

The length of the rear extension 45 of the valve stem part 56 is such that said extension positively prevents closing engagement of the check valve seat 20 by the check valve 21 when the front and rear body parts are properly assembled together.

OPERATION

The operation of the valve assembly 11 will be apparent to persons skilled in this art from the foregoing description thereof so that the following is primarily a summary of such operation. A liquid, such as water, is supplied from a source 12 (FIG. 1) under suitable pressure into the main supply line 13 and thence through the branch pipe 14 into the inlet passageway 18 up to the valve head 41. This pressure cooperates with the tension in the elements 49 in the valve device 40 to urge the valve head 41 snugly against the valve seat 37 and thereby positively prevents the flow of the liquid from the passageway 18 through the opening 34 in the insert 29. When water is flowing through the insert 29, the spherical checkvalve 21 further urges the closing of the valve device 40 by bearing against the uppermost end of the projection 45 in response to the movement of the liquid past the checkvalve. The ring 48 on said valve device 40 serves as a liquid-tight gasket to prevent the escape of liquid between the rear body part 17 and the adjacent rear surface 32 of the annular insert 29.

The valve stem 54 including members 56 and 57 extends to the frontward end of the front body part 23 so that it can be engaged by an animal, such as a rodent, to obtain some of the liquid. Movement of the front member 57 of the valve stem 54 either in a rearward and axial direction or in a radial direction will operate through the rear part 56 to unseat the valve head 41 so that said liquid can move past the valve and thence through the opening 34 into the outlet passageway 27 where it is ingested by the animal. If the front member 57 of valve stem 54 is moved sidewardly or radially, one side of the outer edge of the flange 58 engages the shoulder 59 of front body part 23, thereby causing member 57 to pivot around the point of engagement and providing a mechanical advantage which facilitates the unseating of valve head 41. Accordingly, the diametrically opposite side of the flange 58 is moved away from the shoulder 59 so that the liquid can flow therebetween. At the same time, the flange 58 urges the stem part 56 axially rearwardly, whereby the valve head 41 is unseated, and liquid can now flow from passageway 18 into the opening 31.

Since the front member 57 is axially longer than the radius of flange 58, substantial leverage is provided thereby permitting very small animals, such as young mice, to open the valve 40 even though they would not have the strength to move the valve 40 in a purely axial direction. Preferably, the radius of the annular flange 58 is substantially less than one-half of the axial length of the front member 57.

As soon as the animal's needs for the liquid have been satisfied and, therefore, it ceases to move the stem 54, the valve head 41 immediately reseats itself within the valve seat 37 due in part to the tension on the elements 49. This closing action of said elements 49 is augmented by the pressure differential in passageway 18 between the uppermost and lowermost portions of check-valve 21 as the liquid flows past it, thereby urging the check valve 21 against the projection 45. As the rear member 56 of the valve stem 54 is moved downwardly by the tension on the elements 49, it forces the flange 58 on the front member 57 against shoulder 59, thereby providing an additional obstruction to contamination of the liquid supply system 10 and the interior of the valve assembly.

Due to the tension in the elements 49, the valve head 41 will be held firmly and sealingly against the valve seat 37 even when there is a failure in the pressure urging the liquid aginst the valve head 41. Thus, there is little possibility of a backflow of any of the liquid which may be present and possibly contaminated within the outlet passageway 27. In this regard, it is noted that valve assemblies of the type described herein are frequently used to supply liquids to small animals which are being used in conducting tests, including the therapeutic effects of certain medicines. Thus, it is highly desirable, if not essential, to isolate the animals from each other, which requires the positive prevention of a feedback into the system which is being used to supply the same liquids to other animals. If negative pressure is devoped within the passageway 18 rearwardly of the check valve 21, siphoning of the water back into the system is avoided by the check valve 21 which will be immediately drawn against the check valve seat 16, thereby positively obstructing the flow of liquid rearwardly of this point.

If a valve device 40 needs replacing or cleaning, disassembly of the valve assembly 11 can be quickly and easily effected merely by disconnecting the front body part 23 from the rear body part 17, after which the insert 29 and valve device 40 can be quickly and easily removed from the front body part 23. Because the check valve 21 immediately engages and closes the check valve seat 20, it is unnecessary to depressurize the entire system 10 when this cleaning is performed. If the lower end of the inexpensive valve stem part 57 has been chewed or is otherwise unfit for use, it can be replaced with a new part 57 without replacing the entire valve device 40.

It has been found that the spherical check valve 21, which can be fabricated from a relatively lightweight, semirigid plastic material, such as ethylene-propylene, for example, serves the further purpose of moderating the flow of liquid through the passageway 18 when the valve head 41 is suddenly useated, thereby improving the operation of the valve assembly in supplying the liquid to the animal. The pressure of the liquid against the ball is transferred against the rear extension 45 of the stem 54, when the valve 40 is open, to provide a more positive closing of the valve head 41 after actuation of the valve device by the animal.

Although a particular preferred embodiment of the invention has been disclosed above for illustrative purposes, it will be understood that variations or modifications of such disclosure, which lie within the scope of the appended claims, are fully contemplated.

The embodiments of the invention in which an exclusive property or privilege is claimed are defined as follows:

1. In an animal-actuated valve assembly having a first body part with an inlet passageway and a second body part with an outlet passageway communicating with said inlet passageway, and means adapted to effect a liquid-tight connection between said body parts, a valving device comprising:

means defining first and second, annular and coaxial check valve seats spaced from each other in said inlet passageway;

check valve means within said inlet passageway between said seats and engageable therewith, one at a time, for closing the openings therethrough;

means defining an annular valve seat concentrically within said outlet passageway and facing toward said inlet passageway;

a valve head and means coacting with said valve head for holding said head against said annular valve seat to close said outlet passageway;

abutments means in said outlet passageway;

a two-piece valve stem having a first part secured to said valve head and slidably extending along a portion of said outlet passageway and a second part engaged by said first part and extending loosely through and beyond the remainder of said outlet passageway, said second part having radially extending means adjacent said first part and engageable with said abutment means for permitting sideward, pivotable movement of the extended end of said second part around said abutment means, whereby said second part causes said first part to unseat said valve head; and means coacting with said valve head and adapted to extend through the adjacent one of said first and second check valve seats for engagement with said check valve means to block the seating of said check valve means with said adjacent check valve seat when said first and second body parts are connected together.

2. A valve assembly according to claim 1, wherein the means for holding the valve head against said annular valve seat includes resiliently flexible means secured to said valve head and radially extending away therefrom transaxially of said valve stem, said flexible means being clamped near its outer edge between the adjacent ends of said rear and front body parts whereby said valve head is yieldably held against said annular valve seat.

3. A valve assembly according to claim 2, wherein said valve head has a curved surface situated intermediate said valve seat and one of said check valve seats and adapted to close the opening through said valve seat positively in a direction away from said first body part.

4. A valve assembly according to claim 1, wherein said second part has a cylindrical element which extends through said outlet passageway, and said radially extending means is an annular flange at the end of said cylindrical element;

wherein said abutment means is an annular shoulder located about midway between the ends of said outlet passageway and facing toward said inlet passageway; and whereby said outlet passageway is closed by engagement of said annular flange with said annular shoulder when said valve seat is closed by said valve head, and whereby radial movement of the extended end of said cylindrical element causes said second part to pivot around a point of engagement between the edge of said flange and said shoulder, thereby moving said first part axially.

5. A valve assembly according to claim 4, wherein the radius of said annular flange is substantially less than half the axial length of said cylindrical element.

6. A valve assembly according to claim 1, wherein said check valve means is spherical, and wherein said means for holding the valve head against the valve seat includes a ring and a plurality of radially disposed elements integral with and extending between said ring and said valve head, said radially disposed elements being resiliently flexible.

7. A valve assembly according to claim 1, wherein said check valve means is a sphere situated within said inlet passageway, and wherein said valve head is substantially hemispherical.

8. A valve assembly according to claim 1, wherein said means coacting with said valve head for engagement with said check valve means to block the seating of said check valve means with said adjacent check valve seat includes a blocking member fixedly secured to said valve head and projecting away therefrom in a direction opposite from said first part of said two-piece valve stem.

References Cited

UNITED STATES PATENTS

| | | | |
|---|---|---|---|
| 2,678,630 | 5/1954 | Frederiksen | 119—75 |
| 3,410,249 | 11/1968 | Allen et al. | 119—75 X |
| 3,428,028 | 2/1969 | Hart | 119—75 |

HUGH R. CHAMBLEE, Primary Examiner